(12) United States Patent
Jeon

(10) Patent No.: US 12,108,021 B2
(45) Date of Patent: Oct. 1, 2024

(54) CAMERA RIG APPARATUS FOR CAPTURING STEREOSCOPIC IMAGE

(71) Applicant: VENTAVR CO., LTD, Seoul (KR)

(72) Inventor: Woo Yeol Jeon, Goyang-si (KR)

(73) Assignee: VENTAVR CO., LTD, Seoul (KR)

( * ) Notice: Subject to any disclaimer, the term of this patent is extended or adjusted under 35 U.S.C. 154(b) by 0 days.

(21) Appl. No.: 18/693,155

(22) PCT Filed: Oct. 7, 2022

(86) PCT No.: PCT/KR2022/015181
§ 371 (c)(1),
(2) Date: Mar. 19, 2024

(87) PCT Pub. No.: WO2023/059147
PCT Pub. Date: Apr. 13, 2023

(65) Prior Publication Data
US 2024/0267501 A1 Aug. 8, 2024

(30) Foreign Application Priority Data

Oct. 7, 2021 (KR) ........................ 10-2021-0133222

(51) Int. Cl.
*H04N 13/243* (2018.01)
*G03B 17/56* (2021.01)

(52) U.S. Cl.
CPC ......... *H04N 13/243* (2018.05); *G03B 17/561* (2013.01)

(58) Field of Classification Search
CPC .................................................. H04N 13/243
See application file for complete search history.

(56) References Cited

U.S. PATENT DOCUMENTS

| | | | | |
|---|---|---|---|---|
| 6,141,034 A | * | 10/2000 | McCutchen | H04N 13/363 348/E13.058 |
| 6,701,081 B1 | * | 3/2004 | Dwyer | G03B 41/00 396/329 |
| 2018/0027152 A1 | * | 1/2018 | Sheridan | H04N 13/239 348/47 |

FOREIGN PATENT DOCUMENTS

| | | |
|---|---|---|
| JP | 1023468 A | 1/1998 |
| JP | 2017521897 A | 8/2017 |
| KR | 101494871 B1 | 2/2015 |
| KR | 20160087293 A | 7/2016 |

(Continued)

OTHER PUBLICATIONS

Office Action of KIPO for Korean application No. 10-2021-0133222, issued on Nov. 18, 2021.

(Continued)

*Primary Examiner* — Rowina J Cattungal
(74) *Attorney, Agent, or Firm* — NKL Law; Byungwoong Park

(57) ABSTRACT

The present disclosure relates to a camera rig apparatus, for capturing a stereoscopic image, which is capable of adjusting the ideal interocular distance (IOD) between an object and cameras and can be easily carried around. The camera rig apparatus includes: a middle shaft having a pillar shape and having an HDMI splitter mounted on the top part; a body plate inserted through so as to be fixed to the outer surface of the middle shaft; and camera mounting members having a pair of cameras, which are cable-connected to the HDMI splitter, mounted thereon, and radially provided in a plurality so as to be movable with the body plate.

4 Claims, 8 Drawing Sheets

(56) References Cited

FOREIGN PATENT DOCUMENTS

| | | |
|---|---|---|
| KR | 20200076222 A | 6/2020 |
| KR | 102404624 B1 | 6/2022 |
| KR | 2023059147 A1 | 4/2023 |

OTHER PUBLICATIONS

Notice of Allowance Action of KIPO for Korean application No. 10-2021-0133222, issued on Mar. 29, 2022.
WIPO International Search Report for PCT/KR2022/015181, issued on Jan. 9, 2023.

* cited by examiner

CAMERA RIG APPARATUS FOR CAPTURING STEREOSCOPIC IMAGE

TECHNICAL FIELD

The present disclosure relates to a camera rig apparatus, for capturing a stereoscopic image, which is capable of adjusting the ideal interocular distance (IOD) between an object and cameras and can be easily carried around.

BACKGROUND ART

Generally, in order to capture a multi-view image, two or more cameras are fixed to a rig apparatus and the rig apparatus is adjusted to control a position between cameras.

Further, in order to capture a stereoscopic image, all cameras need to be located at a constant distance from a subject and the cameras need to be disposed at the same interval.

In this connection, the interval between cameras needs to vary in accordance with the distance between the camera and the subject. For example, when a subject in a short distance is shot, the interval between cameras needs to be adjusted to be narrow. In contrast, when a subject at a long distance is shot, the interval between cameras needs to be adjusted to be wide.

However, a rig apparatus of the related art needs to control a position for every camera. Therefore, whenever the subject is changed, the interval between the cameras needs to be adjusted, and this is inconvenient. Further, when the number of cameras is increased, all the rig apparatuses corresponding to each camera need to be adjusted, so that it takes lots of time to adjust the rig apparatuses. Further, this issue causes inconvenience in adjusting the ideal interocular distance (IOD) between an object and the camera.

In addition, the conventional rig apparatus is structurally inconvenient to carry around, so it takes a considerable amount of time to disassemble and reassemble for movement, which also causes the inconvenience of delaying capturing.

SUMMARY

Technical Problems

An aspect of the present disclosure is directed to providing a rig apparatus that allows easy position control of a plurality of cameras, shortening the adjustment time of the rig apparatus, and making it easy to reassemble after disassembly upon movement or storage.

Technical Solution

A camera rig apparatus, for capturing a stereoscopic image according to an embodiment of the present disclosure includes: a middle shaft 100 having a pillar shape and having an HDMI splitter 30 mounted on the top part; a body plate 200 inserted through so as to be fixed to the outer surface of the middle shaft 100; and camera mounting members 300 having a pair of cameras 40, which are cable-connected to the HDMI splitter 30, mounted thereon, and radially provided in a plurality so as to be movable with the body plate 200. The camera mounting member 300 includes: camera plates 310 radially inserted in a plurality so as to be slidable with the body plate 200; guide plates 320 fixed to be perpendicular to the camera plates 310; and mounts 330 provided in a pair such that the cameras 40 are mounted thereon, and provided so as to be slidable with the guide plates 320.

In addition, the camera plates 310 further include a fixing unit 311 capable of tightening and loosening, wherein the fixing unit 311 allows the camera plates 310 to be mutually fixed or moved depending on the degree of tightness by penetrating a distance adjustment hole 210 perforated in the body plate 200 to have a predetermined length. It is preferable that the moving distance of the camera plates 310 is identified based on a scale 20 displayed on the outer surface of the body plate 200.

In addition, the guide plate 320 includes a pair of gap adjustment holes 321 into which the mounts 330 are movably inserted. It is preferable that the moving distance of each of the mounts 330 moving within the gap adjustment hole 321 is identified based on the scale 20 displayed on the outer surface of the guide plate 320.

In addition, the mount 330 includes: an insert 331 having a hollow portion 333 into which the camera 40 is inserted and mounted; a moving piece 335 that extends downward and is connected to the insert 331, is movably installed in contact with the guide plate 320, and has a fastening hole 337 perforated on the surface opposite to the gap adjustment hole 321; and a fixing screw 340 that penetrates the gap adjustment hole 321 and the fastening hole 337 and is provided so that the mount 330 is able to be fixed or moved with the guide plate 320 depending on the degree of tightening. The insert 331 is formed in an arc shape, and includes a first rotating body 331*a* and a second rotating body 331*b* that are rotatably coupled to each other. It is preferable that the hollow portion 333 is opened and closed through rotation of the first rotating body 331*a*, and that the fixing screw 340 is disposed in close proximity to the scale 20 so that the moving distance of the moving piece 335 is able to be checked.

In addition, it is preferable that the middle shaft 100 includes: at least one pillar-shaped bridge 110 installed to be supported by being fastened to a lower part of the body plate 200, the top part of which is inserted through; and a coupling plate 120, the top part of which is fastened to the lower part of the bridge 110, and the lower part of which is fastened to a tripod 10.

Effect of Invention

According to an embodiment of the present disclosure, unlike the conventional one, a camera mounting member configured of a total of 8 cameras along a plurality of distance adjustment holes formed in a body plate that is fixedly inserted through the outer surface of a middle shaft installed vertically on an installation floor surface is adjusted in the forward and backward directions based on the middle shaft, as well as the distance between the cameras provided on a mount, enabling 360° capturing of an subject, which has the benefit of adjusting the ideal IOD.

In addition, unlike the related art, a rig apparatus of an embodiment of the present disclosure can be easily disassembled and installed, allowing the rig apparatus to be carried around and moved.

DETAILED DESCRIPTION OF EXEMPLARY EMBODIMENTS

Figure 1:
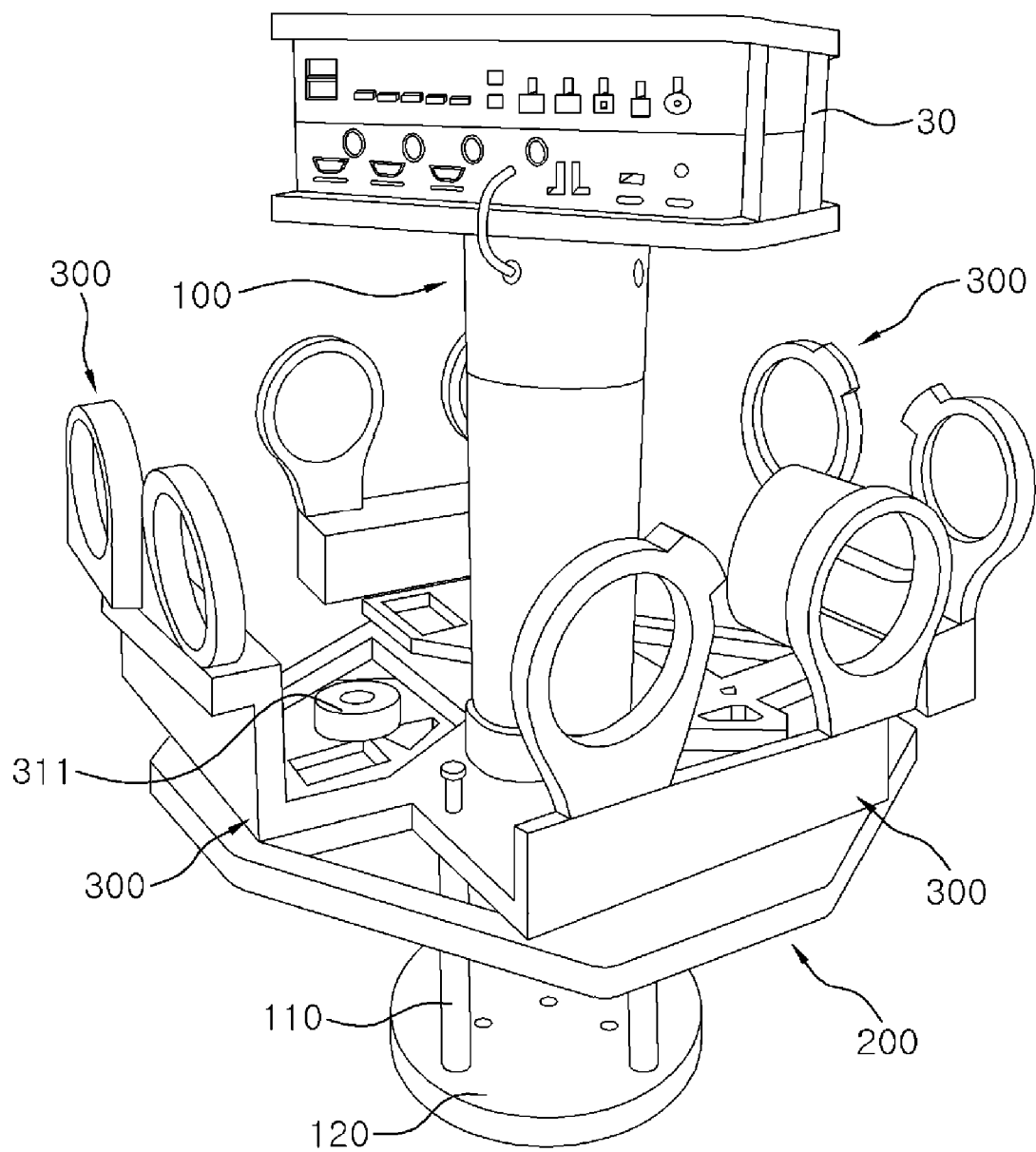
FIG. 1 is a diagram illustrating a camera rig apparatus for capturing a stereoscopic image according to an embodiment of the present disclosure.

Various embodiments of the present disclosure will be described herein below with reference to the accompanying drawings. Embodiments described in the present disclosure may be variously changed. Specific embodiments are illustrated in the drawings and are described in detail in the detailed descriptions. However, specific embodiments described in the accompanying drawings are merely provided for easy understanding of various embodiments. Accordingly, the technical concept of the present disclosure is not limited by specific embodiments disclosed in the accompanying drawings, and should be construed as including all equivalents or alternatives included in the technical concept of the present disclosure and the technical scope.

The terms such as "first" and "second" may be used to describe various elements, but the elements are not limited by the above-described terms. These terms may be used for the purpose of distinguishing one element from another element.

The term "include" or "have" used in the exemplary embodiments of the present disclosure indicate the presence of corresponding features, numbers, steps, operations, components, parts described in the present disclosure, or a combination thereof, and do not preclude the presence of one or more other features, numbers, steps, operations, components, parts, or a combination thereof. It will be understood that when an element is "coupled with/to" or "connected with" another element, the element may be directly coupled or connected with/to another element, and there may be an intervening element between the element and another element. To the contrary, it will be understood that when an element is "directly coupled with/to" or "directly connected to" another element, there is no intervening element between the element and another element.

In addition, in the following description, when it is determined that the specific descriptions of well-known functions or configurations unnecessarily obscure the gist of the present disclosure, the detailed description therefor may be abbreviated or omitted.

Hereinafter, a camera rig apparatus for capturing a stereoscopic image according to an embodiment of the present disclosure (hereinafter simply referred to as "rig apparatus") will be described in detail with reference to the attached drawings.

Figure 8:
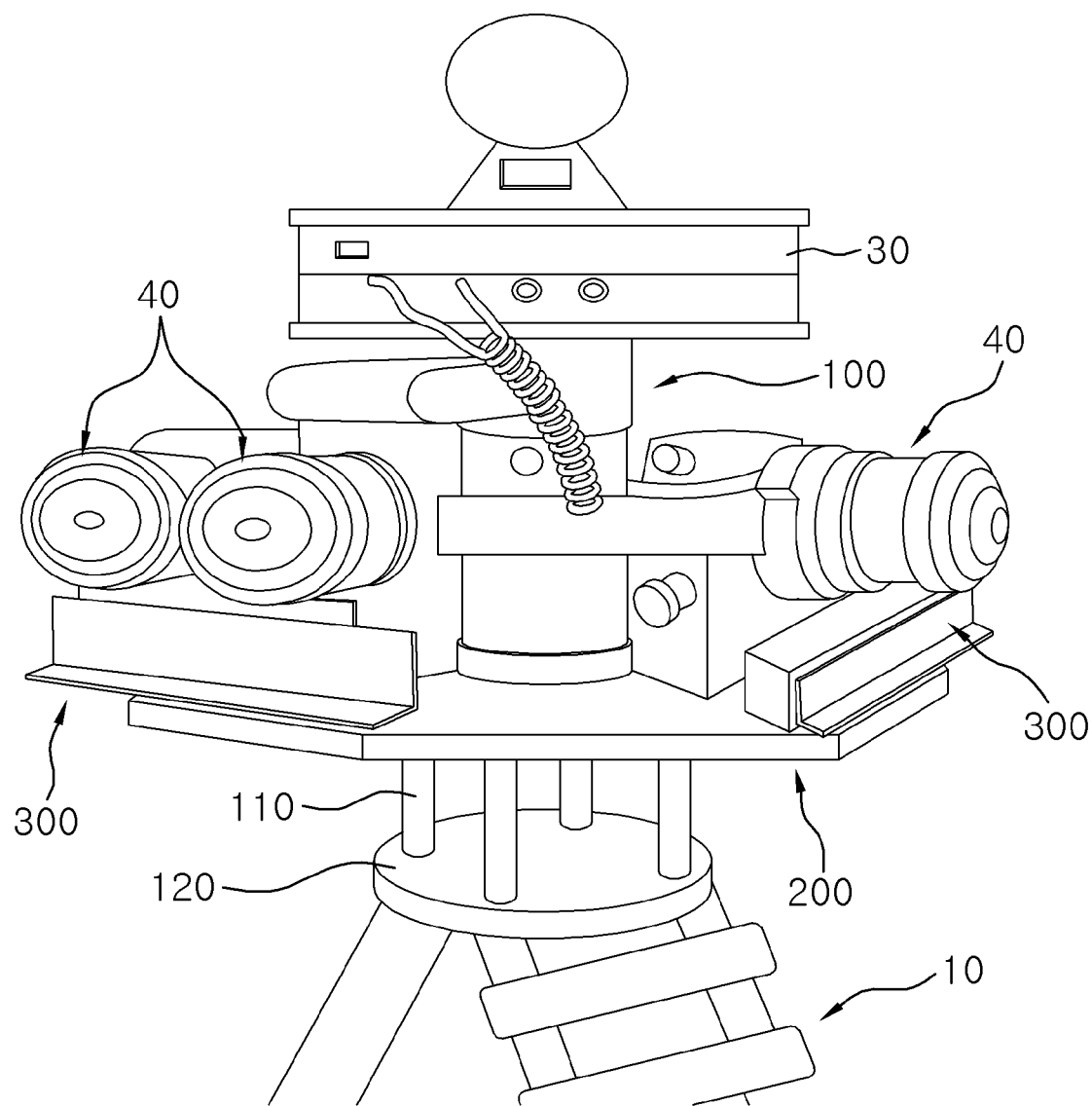
FIG. 8 is a diagram illustrating a tripod installed in the camera rig apparatus for capturing a stereoscopic image according to an embodiment of the present disclosure.

First, as illustrated in FIGS. 1 and 8, a rig apparatus 1 according to an embodiment of the present disclosure, on a large scale, includes a middle shaft 100, a body plate 200, and a camera mounting member 300.

In more detail, as illustrated, the middle shaft 100 is provided with the body plate 200 on which the camera mounting member 300, which will be described later, is movably installed, and includes a bridge 110 and a coupling plate 120 configured to enable mounting and capturing of a plurality of cameras 40 in a 3600 direction.

For example, the middle shaft 100 is formed to have an overall pillar shape, an HDMI splitter 30 including the camera 40 and a microphone connected to a cable is mounted on an top part of the middle shaft 100, and on the outer surface, the body plate 200 is fixedly installed to be inserted through.

At least one bridge 110 is installed at the lower part of the body plate 200 so that the top part thereof is able to be fastened through a fastening unit such as a bolt or screw, and the lower part thereof is fixedly coupled to the coupling plate 120 through another fastening unit to prevent the movement of the body plate 200.

As illustrated, a tripod 10 supported on an installation floor surface is detachably installed at the lower part of the coupling plate 120 fastened to the lower part of the bridge 110, so that the rig apparatus 1 according to an embodiment of the present disclosure is able to be disposed to have a predetermined height based on the installation floor surface. If necessary, the coupling plate 120 is mounted on a vehicle by another bracket (not shown) in addition to the tripod 10 to selectively enable 360° capturing using the plurality of cameras 40.

Figure 2:
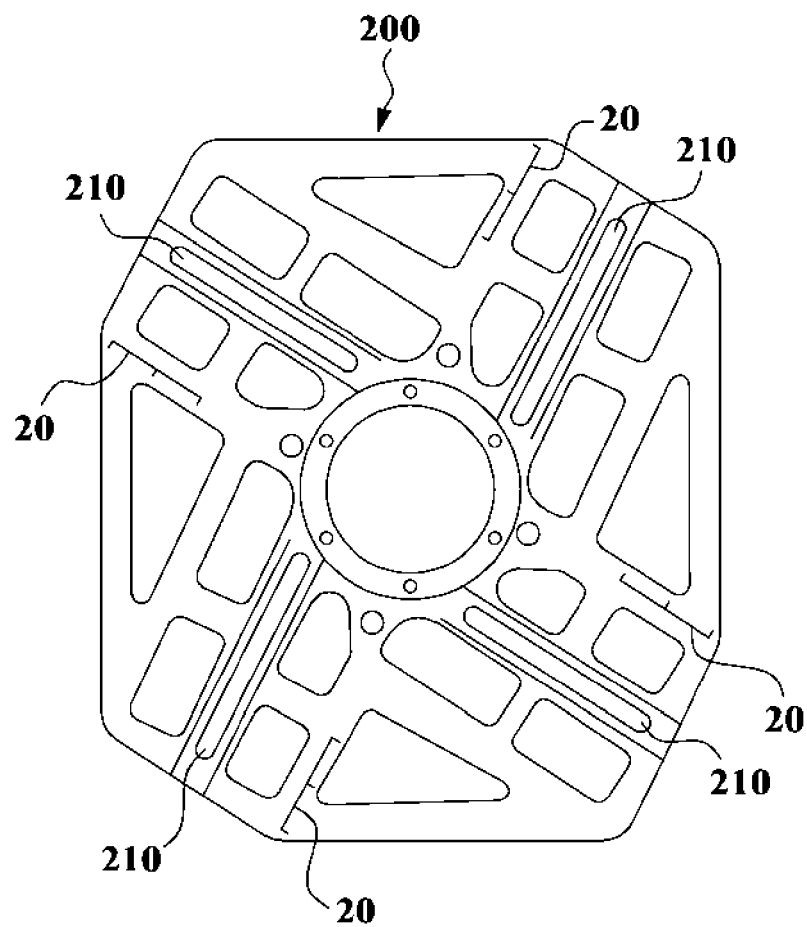
FIG. 2 is a diagram illustrating a body plate for a camera rig apparatus for capturing a stereoscopic image according to an embodiment of the present disclosure.
Figure 3:
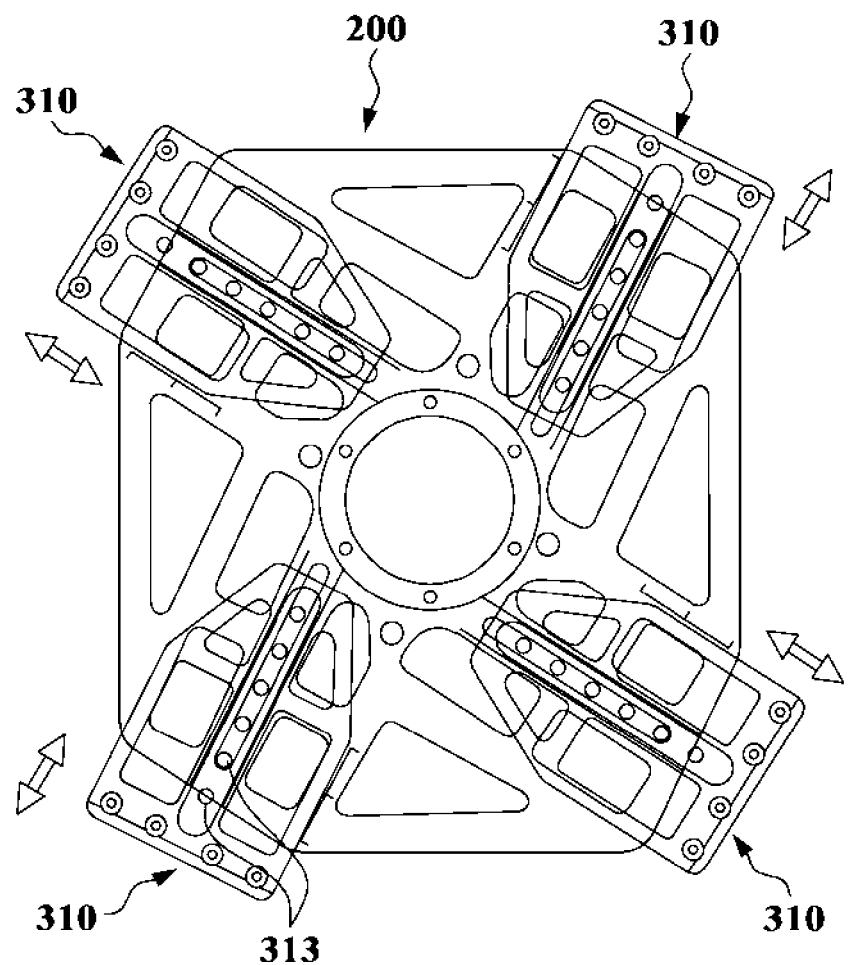
FIG. 3 is a diagram illustrating a plurality of camera plates movably provided on the upper surface of the body plate of FIG. 2.

In addition, as illustrated in FIGS. 2 and 3, the body plate 200 has a plurality of camera mounting members 300, which will be described later, installed radially to enable 360° capturing through the camera 40, and is configured to guide the camera 40 to move in the forward and backward directions.

To this end, as illustrated, the body plate 200 is inserted into the middle shaft 100 through a through hole formed in the center of the area so as to be fixedly installed on the outer surface of the middle shaft 100 by the bridge 110 provided on the top part of the coupling plate 120.

In addition, on the outer surface of the body plate 200, a plurality of distance adjustment holes 210 for individual slide movement of each of the camera mounting members 300 are perforated in a radial form centered on the through hole, and the camera mounting member 300, which slides along the distance adjustment hole 210, may be fixed or moved by creating a difference in the pressure of a fixing unit 311 depending on the degree of tightening of the fixing unit 311 that may be loosened and tightened.

In this connection, it is preferable that a scale 20 is formed on the outer surface of the body plate 200 to identify the moving distance of the camera mounting member 300 moving along a length direction of each of the distance adjustment holes 210, and the corresponding scale 20 is also formed on a guide plate 320 so that a pair of cameras moving along the gap adjustment hole 321, which will be described later, may identify the moving distance of a mount 330 that controls the gap therebetween.

Furthermore, as illustrated, the plurality of distance adjustment holes 210 formed in the body plate 200 are each formed to have a diagonal shape, thereby reducing the overall volume of the body plate 200 and increasing the moving distance of the camera mounting member 300.

Figure 4:
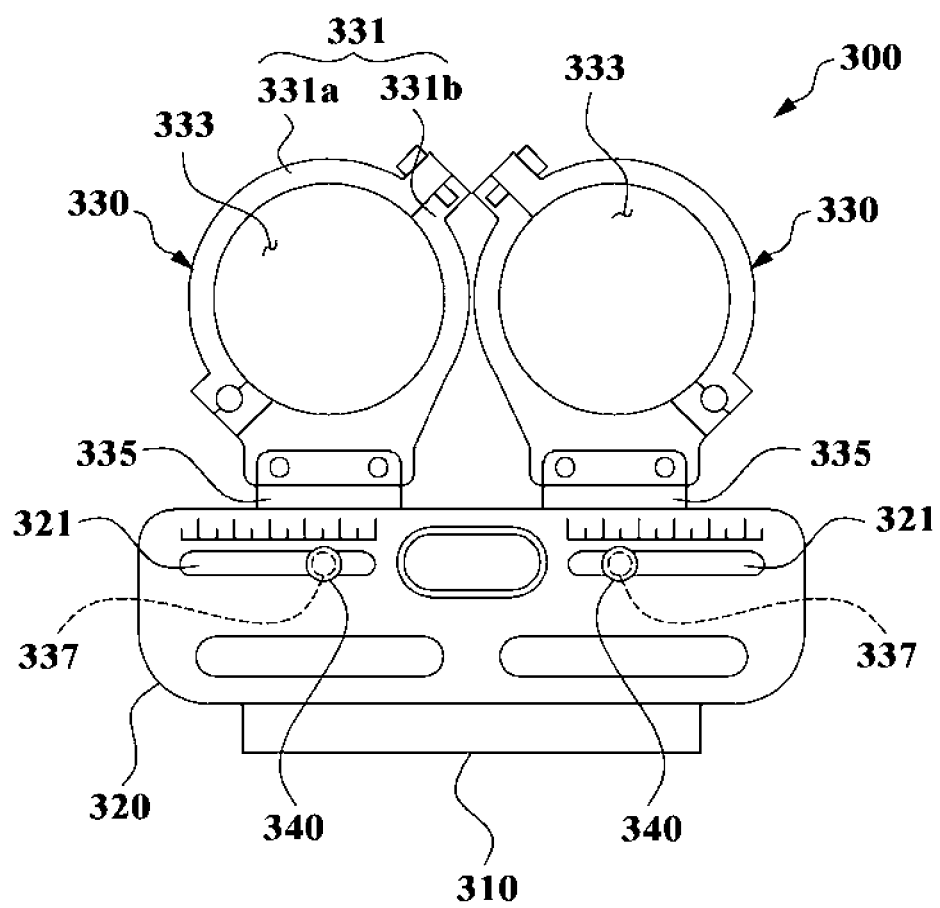
FIG. 4 is a diagram illustrating a camera mounting member for a camera rig apparatus for capturing a stereoscopic image according to an embodiment of the present disclosure.
Figure 5A:
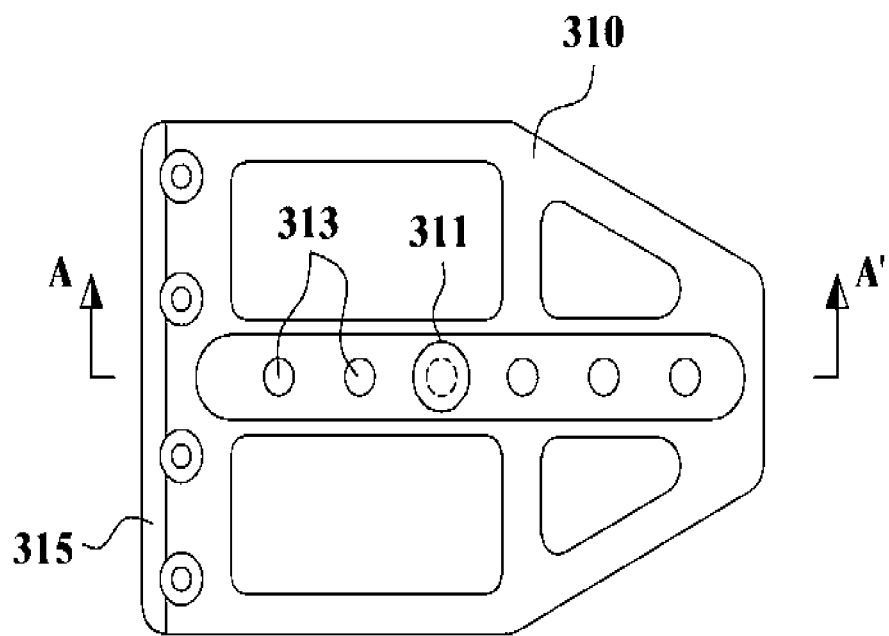
FIG. 5A is a diagram illustrating the camera plate for FIG. 4.
Figure 5B:
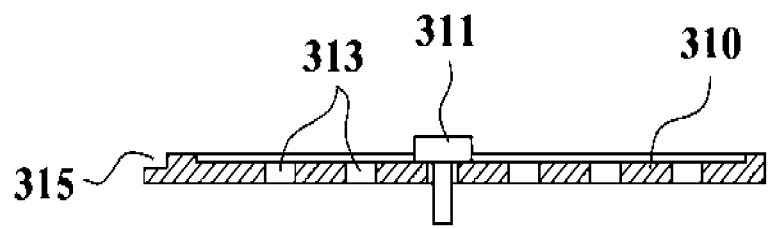
FIG. 5B is a cross-sectional diagram along A-A' of FIG. 5A.
Figure 6:
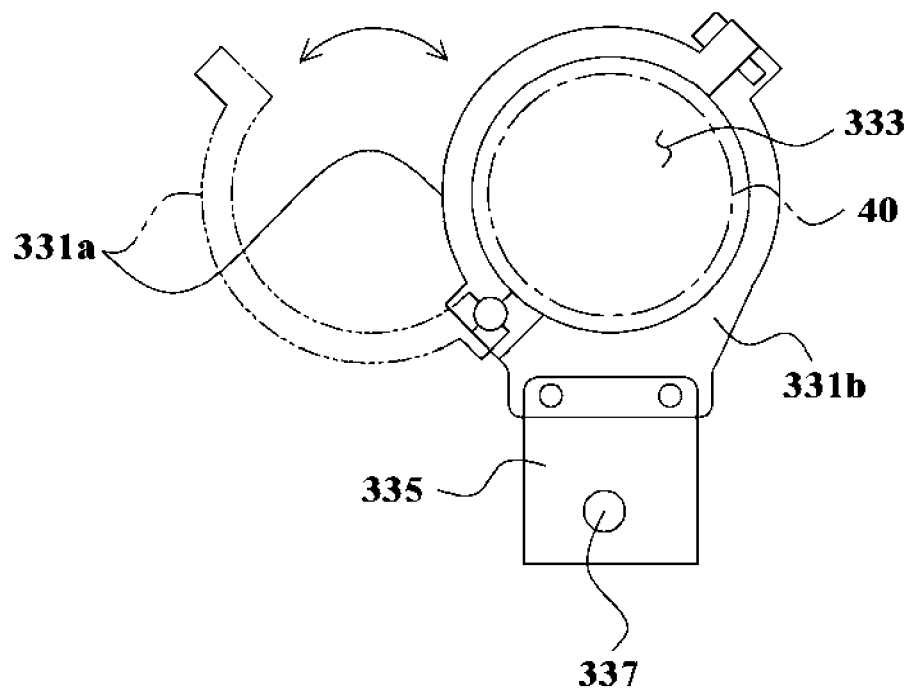
FIG. 6 is a diagram illustrating the mount for FIG. 5.
Figure 7:
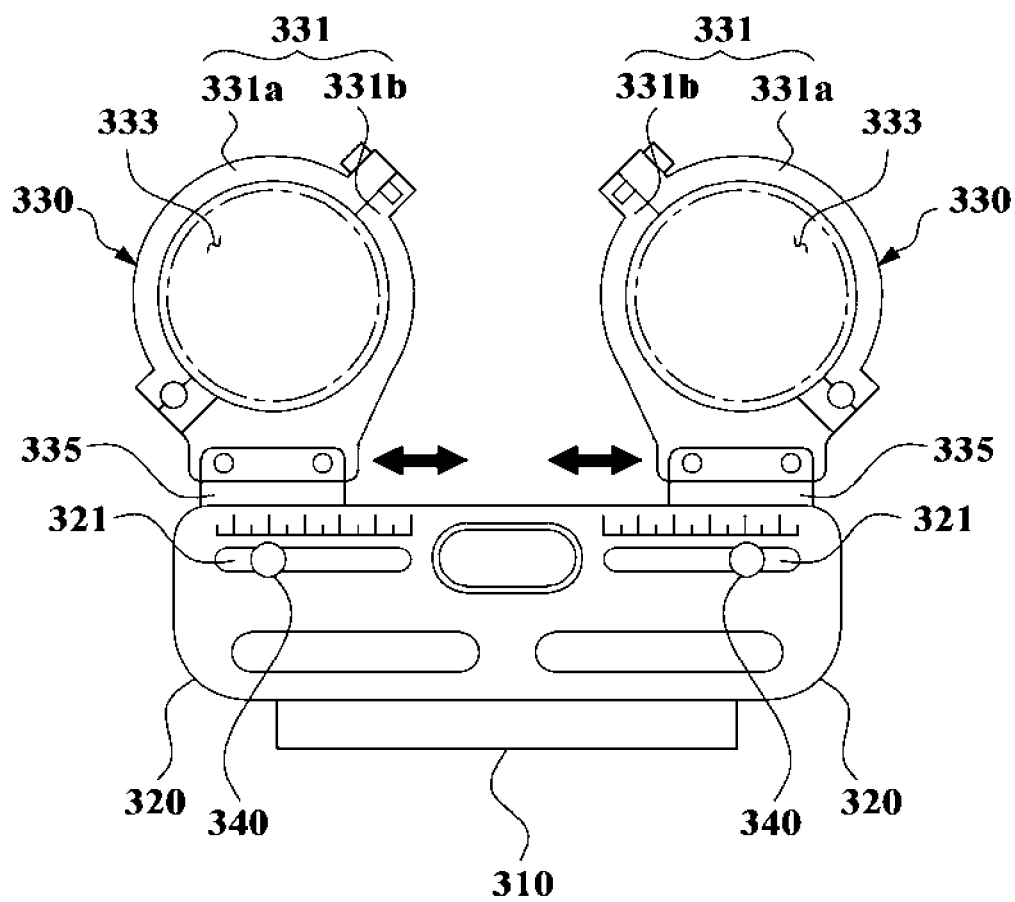
FIG. 7 is a functional relationship diagram for FIG. 4.

In addition, as illustrated in FIGS. 4 to 6, the plurality of the camera mounting members 300 are movably installed on the aforementioned body plate 200, and include a camera plate 310, a guide plate, and the mount 330 in the configuration to enable adjustment of the most ideal interocular distance (IOD) between the cameras according to the distance at which an object is captured through a total of 8 cameras 40.

For example, as illustrated, a plurality of the camera plates 310 are radially seated on the upper surface of the body plate 200, and one of a plurality of adjustment holes 313 perforated on the outer surface is connected to a distance adjustment hole 210 by the fixing unit 311, so that the camera plate 310 has a structure that may be fixedly installed on the body plate 200 after movement.

A guide plate 320 in the shape of a plate is inserted into the upper surface of the camera plate 310, and a seating groove 315 is formed for being fixedly installed by a fastening unit so as to be perpendicular to each other.

In addition, as illustrated, the guide plate 320 has the overall shape of a plate, and on its outer surface, a pair of the gap adjustment holes 321 are perforated adjacent to each other in close proximity to the scale 20, and the mount 330 is movably installed in each of the gap adjustment holes 321 by means of a fixing screw 340 inserted therethrough.

A pair of the mounts 330 each mounted with the camera 40 are movably installed on the outer surface of one guide plate 320 through a plurality of the gap adjustment holes 321, thus allowing to adjust the gap between a total of two cameras 40. Thereby, the rig apparatus 1 of an embodiment of the present disclosure enables 360° capturing with a total of 8 cameras 40 (see FIG. 8).

In addition, the mount 330 is configured to install a pair of the cameras 40 whose gap is adjustable based on one guide plate 320, and includes an insert 331 and a moving piece 335.

As illustrated, the insert 331 has the overall shape of a ring so that a hollow portion 333 in which the camera 40 is seated is formed, and the shape of the ring has a structure that may be implemented through a first rotating body 331a and a second rotating body (331b) that are rotatably and axially coupled to each other.

Herein, the second rotating body 331b is formed to be connected to the top part of the moving piece 335, thereby enabling the camera 40 inserted into the hollow portion 333 to be attached. One side of the first rotating body 331a is rotatably and axially coupled to one side of the second rotating body 331b by a rotation axis, so that the hollow portion 333 is opened and closed according to the rotation of the first rotating body 331a, thereby enabling the camera 40 to be detached.

In this connection, it is preferable that the other sides of each of the first and second rotating bodies 331a and 331b, which are not axially coupled to each other, are fixed through a fastening unit while facing each other, so that the camera 40 inserted through the hollow portion 333 is fixed through pressurization of the insert 331.

The moving piece 335 is entirely molded into the shape of a plate. A fastening hole 337 into which the fixing screw 340 passing through a gap adjustment hole 321 is inserted is perforated on the outer surface opposite the gap adjustment hole 321, and has a structure that may be slidable in a length direction of the gap adjustment hole 321 depending on the degree of tightening of the fixing screw 340.

As described above, unlike the conventional one, the rig apparatus 1 according to an embodiment of the present disclosure is configured such that the camera mounting member 300 configured of a total of 8 cameras 40 along the plurality of distance adjustment holes 210 formed in the body plate 200 that is fixedly inserted through the outer surface of the middle shaft 100 installed vertically on an installation floor surface is adjusted in the forward and backward directions based on the middle shaft 100, as well as the gap between the cameras 40 provided on the mount 330, enabling 360° capturing of an subject, which has the benefit of adjusting the ideal IOD.

In addition, unlike the related art, the rig apparatus 1 may be easily disassembled and installed, allowing the rig apparatus 1 to be carried around and moved.

As described above, the present disclosure has been described with specific details such as specific components and limited embodiments and drawings, but this is merely provided to facilitate a more general understanding of the present disclosure, and the present disclosure is not limited to the above embodiments. It will be appreciated by those skilled in the art that various modifications and variations can be made from this description.

Accordingly, the spirit of the present disclosure should not be limited to the described embodiments, and the patent claims described later as well as everything including variations equal or equivalent to the patent claims pertain to the scope of the spirit of the present disclosure.

The invention claimed is:

1. A camera rig apparatus for capturing a stereoscopic image, the apparatus comprising:
   a middle shaft (100) having a pillar shape and having an HDMI splitter (30) mounted on the top part;
   a body plate (200) inserted through so as to be fixed to the outer surface of the middle shaft (100); and
   camera mounting members (300) having a pair of cameras (40), which are cable-connected to the HDMI splitter (30), mounted thereon, and radially provided in a plurality so as to be movable with the body plate (200),
   wherein:
   the camera mounting member (300) comprises: camera plates (310) radially inserted in a plurality so as to be slidable with the body plate (200); guide plates (320) fixed to be perpendicular to the camera plates (310); and mounts (330) provided in a pair such that the cameras (40) are mounted thereon, and provided so as to be slidable with the guide plates (320);
   the camera plates (310) further comprise: a fixing unit (311) capable of tightening and loosening; and
   the fixing unit (311) allows the camera plates (310) to be mutually fixed or moved depending on the degree of tightness by penetrating a distance adjustment hole (210) perforated in the body plate (200) to have a predetermined length, and the moving distance of the camera plates (310) is identified based on a scale (20) displayed on the outer surface of the body plate (200).

2. The apparatus of claim 1, wherein:
   the guide plate (320) comprises a pair of gap adjustment holes (321) into which the mounts (330) are movably inserted; and
   the moving distance of each of the mounts (330) moving within the gap adjustment hole (321) is identified based on the scale (20) displayed on the outer surface of the guide plate (320).

3. The apparatus of claim 2, wherein the mount (330) comprises:
   an insert (331) having a hollow portion (333) into which the camera (40) is inserted and mounted;
   a moving piece (335) that extends downward and is connected to the insert (331), is movably installed in contact with the guide plate (320), and has a fastening hole (337) perforated on the surface opposite to the gap adjustment hole (321); and a fixing screw (340) that penetrates the gap adjustment hole (321) and the fastening hole (337) and is provided so that the mount (330) is able to be fixed or moved with the guide plate (320) depending on the degree of tightening, wherein:

the insert (331) is formed in an arc shape, and comprises a first rotating body (331*a*) and a second rotating body (331*b*) that are rotatably coupled to each other; and the hollow portion (333) is opened and closed through rotation of the first rotating body (331*a*), and the fixing screw (340) is disposed in close proximity to the scale (20) so that the moving distance of the moving piece (335) is able to be checked.

4. The apparatus of claim 1, wherein the middle shaft (100) comprises:

at least one pillar-shaped bridge (110) installed to be supported by being fastened to a lower part of the body plate (200), the top part of which is inserted through; and a coupling plate (120), the top part of which is fastened to the lower part of the bridge (110), and the lower part of which is fastened to a tripod 10.

\* \* \* \* \*